(12) United States Patent
Baets et al.

(10) Patent No.: US 9,128,241 B2
(45) Date of Patent: Sep. 8, 2015

(54) INTEGRATED PHOTONICS WAVEGUIDE GRATING COUPLER

(75) Inventors: Roeland Baets, Deinze (BE); Diedrik Vermeulen, St. Pauwels (BE); Yanlu Li, Ghent (BE); Yannick De Koninck, Ghent (BE)

(73) Assignees: UNIVERSITEIT GENT, Ghent (BE); IMEC, Leuven (BE)

( * ) Notice: Subject to any disclaimer, the term of this patent is extended or adjusted under 35 U.S.C. 154(b) by 0 days.

(21) Appl. No.: 14/344,696

(22) PCT Filed: Sep. 13, 2012

(86) PCT No.: PCT/EP2012/067971
§ 371 (c)(1),
(2), (4) Date: Aug. 14, 2014

(87) PCT Pub. No.: WO2013/037900
PCT Pub. Date: Mar. 21, 2013

(65) Prior Publication Data
US 2014/0363127 A1   Dec. 11, 2014

(30) Foreign Application Priority Data
Sep. 13, 2011   (GB) .................................. 1115784.9

(51) Int. Cl.
*G02B 6/34* (2006.01)
*G02B 6/12* (2006.01)
(Continued)

(52) U.S. Cl.
CPC ............ *G02B 6/124* (2013.01); *G02B 6/29326* (2013.01); *G02B 6/12004* (2013.01); *G02B 6/29316* (2013.01); *G02B 6/29328* (2013.01); *G02B 6/30* (2013.01)

(58) Field of Classification Search
CPC . G02B 6/124; G02B 6/29328; G02B 6/29326
USPC ......... 385/37, 14; 359/34, 566, 569, 572, 574
See application file for complete search history.

(56) References Cited

U.S. PATENT DOCUMENTS 5,278,687 A * 1/1994 Jannson et al. ................. 398/79
5,392,308 A   2/1995 Welch et al.
(Continued)

OTHER PUBLICATIONS

"High-efficiency fiber-to-chip grating couplers realized using an advanced CMOS-compatible Silicon-On-Insulator platform," by Vermeulen et al, Optics Express, vol. 18, No. 17, pp. 18278-18283, 2010.*
(Continued)

*Primary Examiner* — Robert Tavlykaev
(74) *Attorney, Agent, or Firm* — Workman Nydegger

(57) ABSTRACT

A photonic integrated device comprises a waveguide embedded in a photonic substrate. The waveguide has a waveguide radiation exit surface and the waveguide is optically connected to a two dimensional grating. The photonic integrated device also comprises a two dimensional grating having a plurality of curved elongate scattering elements. The two dimensional grating is adapted for diffracting radiation received from the waveguide toward a direction out of the photonic substrate and the curved elongate scattering elements are oriented with respect to the waveguide such that, for points of the scattering elements which can be irradiated by radiations stemming from the waveguide, normal lines to at least the curved elongate scattering element closest to the waveguide radiation exit surface do not substantially intersect with the waveguide radiation exit surface of the waveguide.

11 Claims, 12 Drawing Sheets

(51) Int. Cl.
*G02B 5/18* (2006.01)
*G02B 6/124* (2006.01)
*G02B 6/293* (2006.01)
*G02B 6/30* (2006.01)

(56) References Cited

U.S. PATENT DOCUMENTS

| | | | | |
|---|---|---|---|---|
| 5,818,986 | A * | 10/1998 | Asawa et al. | 385/24 |
| 6,285,813 | B1 | 9/2001 | Schultz et al. | |
| 6,504,632 | B1 | 1/2003 | Watanabe et al. | |
| 6,578,388 | B1 * | 6/2003 | Kewitsch et al. | 65/406 |
| 6,590,649 | B1 * | 7/2003 | Broersma | 356/328 |
| 7,184,627 | B1 | 2/2007 | Gunn, III et al. | |
| 8,024,748 | B1 * | 9/2011 | Moravec et al. | 720/659 |
| 2004/0042377 | A1 | 3/2004 | Nikolai et al. | |
| 2005/0226576 | A1 * | 10/2005 | Feder et al. | 385/122 |
| 2005/0286832 | A1 | 12/2005 | Witzens et al. | |
| 2006/0156241 | A1 * | 7/2006 | Psaltis et al. | 715/730 |
| 2006/0177178 | A1 | 8/2006 | Greiner et al. | |
| 2009/0021835 | A1 | 1/2009 | Peters et al. | |
| 2010/0166361 | A1 | 7/2010 | Liu | |

OTHER PUBLICATIONS

GB Search Report for corresponding GB Application No. 1115784.9, mailed Jan. 11, 2012.
International Search Report for corresponding International PCT Application No. PCT/EP2012/067971, mailed Nov. 16, 2012.
Van Laere et al., "Compact Focusing Grating Couplers for Silicon-on-Insulator Integrated Circuits," IEEE Photonics Technology Letters, 2007, pp. 1919-1921, vol. 19, No. 23.

* cited by examiner (a) $\alpha = 0°$  (b) $\alpha = 45°$  (c) $\alpha = 90°$

INTEGRATED PHOTONICS WAVEGUIDE GRATING COUPLER

FIELD OF THE INVENTION

The invention relates to the field of integrated photonics. More particularly it relates to methods and systems for coupling radiation from an integrated photonics waveguide device to a fiber or to free space or vice versa.

BACKGROUND OF THE INVENTION

Photonic integration is considered to be a key technology for future advancement in optical communication technology. Scaling down of the optical building blocks enables cost-effective, complex and ultra-compact photonic circuits, i.e. chips which comprise integrated optical components formed on or in a substrate and which are interconnected by planar waveguides. It is typically desirable to be able to optically couple the signals conducted by such planar waveguides into or out of the integrated chip, for example from or into an optical fiber.

Choosing an appropriate platform for developing this miniaturization technology is guided by functionality, compatibility, performance, yield and cost. Currently, silicon-on-insulator (SOI) can be considered as the leading technology for low-cost and high-volume photonic integration, since it benefits from processes developed in the mature electronics industry. Although the high refractive index contrast of SOI reduces the footprint of integrated photonic devices considerably, it becomes more difficult to achieve a high-performance mode-size convertor between a single-mode optical fiber, with a typical cross-sectional area of 100 $\mu m^2$, and an on-chip integrated optical waveguide, with a typical cross-sectional area in the order of 0.1 $\mu m^2$.

A possible solution is a grating coupler which is a periodic structure that couples light out of the chip, e.g. to free space or to an optical fiber. Fiber-to-chip grating couplers with very high efficiency have been demonstrated. However, a typical reflection back into the on-chip waveguide for such a high-efficiency grating coupler may be around −17 dB, while high back-reflections of −10 dB and −8 dB have been reported as well. These levels of back-reflection may be unacceptable for integrated circuits, especially for example for circuits which contain integrated lasers, or which implement interferometer-based designs.

For grating couplers, two main sources may contribute to the back-reflection, i.e. reflection back into the waveguide. The second order reflection of the grating may be considered the dominant source. Typically this second order reflection may be eliminated by tilting the optical fiber under a small angle of around 10° with respect to the surface normal. The second source of back reflection is due the Fresnel reflection at the grating coupler interface. This reflection may be highly dependent on the grating structure itself and may therefore be very difficult to eliminate.

Besides optimizing reflection and coupling efficiency, there is also an incentive for further reducing integrated photonics circuits in size. In "compact focusing grating couplers for Silicon-on-Insulator integrated circuits" by F. Van Laere et al. in IEEE Photonics Technology Letters 19(23) 2007 p 1919-1921, a compact focusing grating coupler is presented which uses a curved grating to focus the coupled light onto a single-mode waveguide, achieving an eight-fold length reduction as compared to a conventional linear grating with adiabatic taper, without performance penalty. More specifically, this grating is elliptically curved, i.e. comprises a plurality of grating ridges having an elliptical profile. The radiation is coupled to the grating coupler along the direction of the long axes of these grating ridges, and due to the curvature of the grating, the distance between the grating and the output opening of the waveguide can be drastically reduced.

In U.S. Pat. No. 7,184,627 B1, a grating coupler is disclosed, which comprises a plurality of scattering elements, and at least one distributed Bragg reflector to reflect radiation passing through the grating towards the substrate of the grating coupler back toward the grating.

SUMMARY OF THE INVENTION

It is an object of embodiments of the present invention to provide good methods and integrated photonics waveguide based devices for coupling radiation to and from free space or a fiber.

It is an advantage of grating couplers according to embodiments of the present invention that back-reflections, e.g. second order reflections and Fresnel reflections, may be focused away from the entrance waveguide in the integrated waveguide.

It is an advantage of embodiments according to the present invention that reflections, reflecting back into an integrated waveguide, may be avoided or even be substantially extinguished without sacrificing the coupling efficiency of the grating.

It is an advantage of embodiments according to the present invention that radiation may be coupled out of a photonics integrated circuit which comprises an integrated laser with negligible adverse effects of radiation which is reflected back into the circuit at the output coupling.

It is an advantage of embodiments according to the present invention that radiation may be coupled out of an optical integrated circuit having an interferometer-based design with negligible adverse effects of radiation which is reflected back into the circuit at the output coupling.

It is an advantage of embodiments according to the present invention that one or more of the above advantages can be obtained, while the grating coupler still allows for a good miniaturization of the photonics integrated circuit.

The above objective is accomplished by a method and device according to the present invention.

The present invention relates to a photonic integrated device, the photonic integrated device comprising a waveguide embedded in a photonic substrate, the waveguide having a waveguide radiation exit surface and the waveguide being optically connected to a two dimensional grating, a two dimensional grating having a plurality of curved elongate scattering elements, said two dimensional grating being adapted for diffracting radiation received from the waveguide toward a direction out of said photonic substrate, wherein the curved elongate scattering elements are oriented with respect to the waveguide such that, for points of the scattering elements which can be irradiated by radiations stemming from the waveguide, normal lines (B) to at least the curved elongate scattering element closest to the waveguide radiation exit surface (S) do not substantially intersect with said waveguide radiation exit surface (S) of said waveguide. It is an advantage of embodiments according to the present invention that reflection back into the waveguide is reduced or even avoided, thus allowing to avoid e.g. malfunctioning of other optical components in the photonic integrated circuit.

At least one of the plurality of elongate scattering elements may form at least a part of an ellipse having a first focus point substantially positioned on said waveguide radiation exit surface (S) and having a major axis forming an angle different from 0° with a longitudinal axis of the waveguide.

The angle may be larger than half of the sum of the divergence angle of light emanating from said waveguide and the ratio of the maximum diameter of the waveguide end surface over the focal distance between the grating surface and the waveguide radiation exit surface (S).

The angle may be determined taking into account $$\Psi(r) \propto \int\int_{aperture} E_{inc}(x', y') \frac{e^{ik|r-r'|}}{4\pi|r-r'|} dx'dy',$$

whereby every point of the aperture, being the waveguide radiation exit surface, will act as a point source and $\Psi(r)$ is the field strength of radiation stemming from the exit surface S at position r. Integration is performed over the region of the aperture weighted by the field strength $E_{inc}(x',y')$ of the mode.

The angle between the major axis and the longitudinal axis of the waveguide may be between 10° and 170°. In some embodiments, the angle may be between 25° and 155° or between 45° and 135°.

The grating may be an elliptical grating. It is an advantage of embodiments according to the present invention that a grating can be used having a conventional shape, e.g. an elliptical shape.

The grating may be adapted for diffracting radiation received from the waveguide out of the photonics integrated circuit and toward a direction forming an angle larger than 0° with a surface normal to the photonic integrated circuit.

The photonic integrated device furthermore may comprise an integrated laser optically connected to said waveguide.

The photonic substrate may be a silicon-on-insulator substrate.

The plurality of elongate scattering elements may comprise etched lines in a photonic substrate.

The plurality of elongate scattering elements may comprise deposited material strips on top of a photonic substrate. The deposited material strips may be any suitable material, such as for example metal strips or dielectric material strips such as silicon or silicon oxide. The deposited material typically is selected such that it introduces a refractive index periodicity.

The present invention also relates to an optical system comprising a photonic integrated device as described above and an optical fiber in optical communication with the photonic integrated device in order to collect radiation directed from the waveguide by the 2D grating.

The present invention furthermore relates to a method for coupling radiation from a waveguide embedded in a photonic integrated device out of said device, the method comprising directing radiation received from said waveguide through a waveguide radiation exit surface (S) toward a two dimensional grating, the two dimensional grating being adapted for diffracting the radiation received from the waveguide toward a direction out of said device, and the two dimensional grating comprising a plurality of curved elongate scattering elements which are oriented with respect to the waveguide such that, for points of the scattering elements which can be irradiated by radiations stemming from the waveguide, normal lines to at least the curved elongate scattering element closest to the waveguide radiation exit surface do not substantially intersect with said waveguide radiation exit surface (S) of said waveguide, and coupling said radiation using said two dimensional grating out of said photonic integrated device.

The present invention also relates to the use of a photonic integrated device as described above for coupling out or coupling in radiation from or to a photonic integrated device.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
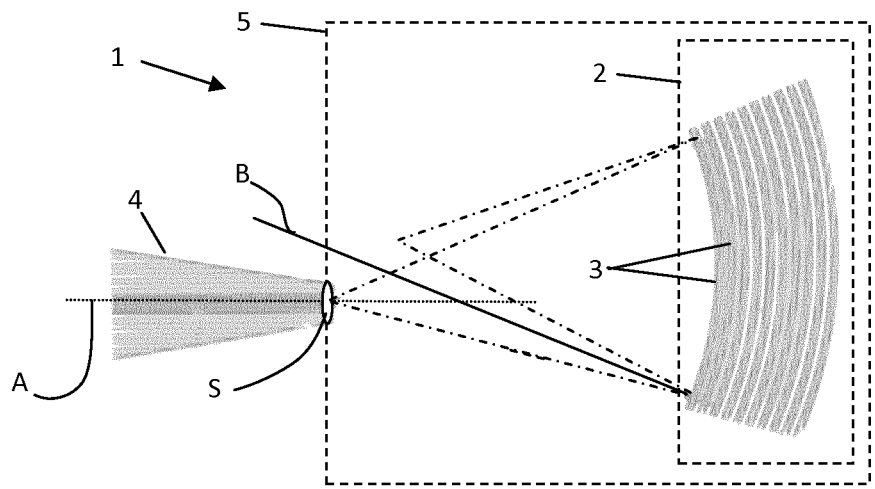
FIG. 1 illustrates an integrated photonic device adapted for reducing reflection or even avoiding back reflection into the entrance waveguide, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present application reference is made to radiation, reference is made to electromagnetic radiation. In some embodiments, the radiation has a wavelength or wavelength range between 400 nm and 10000 nm, although the invention is not limited thereto. Where in embodiments or aspects of the present invention reference is made to optical radiation or to light, the present invention also relates to similar embodiments or aspects for use with other radiation.

Where in embodiments of the present application reference is made to a photonics integrated circuit (PIC) or photonics integrated device, this refers to a variety of forms and material systems such as for example low-index contrast waveguide platforms (e.g. polymer waveguides, glass/silica waveguides, $Al_xGa_{1-x}As$ waveguides, $In_xGa_{1-x}As_yP_{1-y}$ waveguides), high-index contrast waveguides (e.g. Silicon-on-Insulator, semiconductor membranes), plasmonic waveguides (e.g. metal nano-particle arrays, metal layers), also called Photonic Lightwave circuits (PLC). Another particular example of a platform that can be used is the SiN platform. Photonic integrated circuits or photonic integrated devices according to embodiments of the present invention comprise at least an integrated waveguide and a grating. Typically further components also will be present, such as for example but not limiting to an integrated optical cavity, an integrated optical resonator, an integrated optical interferometer, a further integrated optical coupler, a further waveguide, a taper, a tuneable filter, a phase-shifter, a further grating, a modulator, a detector, a source, a multiplexer, a demultiplexer or a combination thereof. The optical components can be active or passive. The components can be integrated for example monolithically, heterogeneously or hybridly. Monolithical integration is the integration technology that uses a single processing flow to process the diverse components potentially using different materials, e.g. integrated germanium detectors in silicon photonics IC. Heterogeneous integration is the integration technology for which the components are processed in separate process flows, which are then integrated at die or wafer level, e.g. BCB bonding, wafer bonding, and other bonding schemes, 3D integration. Hybrid integration is the integration of components or materials on processed photonic integrated platforms, e.g. flip-chipping of detectors, bumping, gluing, wire bonding, co-packaging, etc.

The devices and methods of the present invention are further described for the particular case of an SOI (Silicon-on-Insulator) material system, also referred to as silicon photonics system. However, the devices and methods of the present invention can be based on other material systems, such as for example III-V material systems, metallic layers, low-index contrast material systems or a combination thereof.

Silicon-on-Insulator is a very interesting material system for highly integrated photonic circuits. The high refractive index contrast allows photonic waveguides and waveguide components with submicrometer dimensions to guide, bend and control light on a very small scale so that various functions can be integrated on a chip. Moreover SOI offers a flexible platform for integration with surface plasmon based components which in turn allows for even higher levels of miniaturization. Both waveguide types allow a high level of miniaturization, which is advantageous. Furthermore for both waveguide types light can be efficiently coupled in and out the PIC by use of grating.

Using Silicon-on-insulator also has some technological advantages. Due to the CMOS industry, silicon technology has reached a level of maturity that outperforms any other plane chip manufacturing technique by several orders of magnitude in terms of performance, reproducibility and throughput. Nano-photonic ICs can be fabricated with wafer scale-processes, which means that a wafer can contain a high amount of photonic integrated circuits. Combined with the commercial availability of large wafers at a relative moderate cost, this means that the price per photonic integrated circuit can be very low.

Where in embodiments according to the present invention reference is made to a linear or 1D grating, reference is made to a grating wherein the grating lines have a substantially straight shape, i.e. extend substantially in one direction in the plane of the photonics integrated device.

Where in embodiments according to the present invention reference is made to a curved or 2D grating, reference is made to a grating wherein the grating lines have as substantially curved shape, i.e. extend substantially in two directions in the plane of the photonics integrated device.

In a first aspect, the present invention relates to photonics integrated devices, also referred to as photonic integrated circuits (PIC), such devices comprising a grating and integrated waveguide for coupling light from an integrated waveguide to an optical fiber or to free space. The photonic integrated device comprises a waveguide embedded in the photonic substrate. The waveguide has a waveguide radiation exit surface and is optically connected to a two dimensional grating. The two dimensional grating, which is part of the photonic integrated device, has a plurality of curved elongate scattering elements and is adapted for diffracting radiation received from the waveguide toward a direction out of said photonic substrate. According to embodiments of the present invention, the curved elongate scattering elements are oriented with respect to the waveguide such that, for points of the scattering elements which can be irradiated by radiations stemming from the waveguide, normal lines to the curved elongate scattering elements do not intersect with said waveguide radiation exit surface of said waveguide. By way of illustration, embodiments of the present invention not being limited thereto, features and advantages will be described in more detail below with reference to the FIG. 1, indicating an exemplary embodiment of a photonic integrated device.

FIG. 1 illustrates a first exemplary embodiment of a photonic integrated device 1 according to the first aspect of the invention. The photonic integrated device 1 comprises a waveguide 4 embedded in a photonic substrate. As indicated above, the photonic integrated device may be based on a silicon-on-insulator (SOI) substrate, although embodiments of the present invention are not limited thereto. The photonic integrated device 1 may furthermore comprise other components, such as for example an integrated laser optically connected to this waveguide 4.

The waveguide 4 may for example be a single-mode integrated waveguide, for example a broad waveguide in an SOI substrate. This waveguide 4 may have an end portion, for example directed along a waveguide axis A. The end portion further is referred to as the waveguide radiation exit surface. It is to be noticed that the present description makes use of the concept of outcoupling of the radiation out of the photonic integrated device, but that an alternative description could equally be provided for radiation coupled in and the components and device described in embodiments of the present invention can equally be used for radiation incoupling in the photonic integrated device. The waveguide is in optical communication with a two dimensional grating, also being part of the photonic integrated device. The waveguide is in optical communication with a two dimensional grating via a waveguide radiation exit surface S. The waveguide radiation exit surface may for example be the abutting end of the end portion of the waveguide.

The two dimensional grating may be part of a guiding portion 5 of optically conductive material. The guiding portion 5 may be a region in a planar slab of the photonic substrate, e.g. in a continuation of the photonic substrate wherein the waveguide 4 is embedded.

The two dimensional grating 2 is adapted for diffracting radiation, e.g. light, received from the waveguide 4 toward a direction out of said photonic substrate, for example, in a direction having a substantial normal component relative to a surface of the guiding portion 5. The two dimensional grating 2 comprises a plurality of curved elongate scattering elements 3, which may be curved such that a plain wavefront travelling through a TE-polarized or TM-polarized mode of the waveguide 4 may be phase-matched to, for example, a tilted optical fiber positioned in said direction out of said photonic substrate. These elongate scattering elements 3 may comprise etched lines in a photonic substrate wherein the guiding portion 5 is embedded. Alternatively or additionally, this plurality of elongate scattering elements 3 may comprise deposited materials such as for example—embodiments of the present invention not being limited thereto—silicon lines or metal lines, e.g. deposited gold lines, on top of a photonic substrate.

The plurality of curved elongate scattering elements 3 are oriented such that normal lines B to at least the curved elongate scattering element 3 closest to the waveguide radiation exit surface S at points which are illuminated by radiation stemming from the waveguide 4 do not intersect with the waveguide radiation exit surface S. The above requirement advantageously is valid for at least 50% of the points illuminated, more advantageously at least 70% of the points illuminated, even more advantageously at least 90% of the points illuminated. For example such normal lines B at points on the scattering element 3 within a predetermined cone around the waveguide axis A corresponding to a divergence angle of light emanating from the waveguide radiation exit surface S. The elongate scattering elements therefore may be at least partially elliptically shaped, at least partially oval shaped, or have another shape such as for example a hyperbolic shape, a parabolic shape, or any second order (or higher order) function. If the curved elongate scattering elements have the same shape, the requirement of non-intersection is valid for all curved elongate scattering elements. There nevertheless can also be a difference in the first grating line with respect to the following lines, since the effective refractive index in the grating region can be different from the refractive index in the slab region. The transmitted light at the first grating line will thus be diffracted at the transition from slab to grating region. This diffraction (according to Snell's law) is angle dependent. Since the angle of the light incident on the first grating line varies a lot, the diffraction angle will also change. In case there is a variation in the shape of the elongate scattering elements or for large differences in effective refractive index in regions of different elongate scattering elements, the requirement for non-intersection of the normal is valid for at least the elongate scattering element closest to the waveguide radiation exit surface (S).

In particular embodiments, at least one—but also more or all—of the plurality of elongate scattering elements 3 may form at least a part of an ellipse having a first focus point substantially positioned on the waveguide radiation exit surface S and having a major axis forming an angle with said waveguide axis. In some embodiments, the grating is an elliptical grating. In preferential embodiments of the present invention, this angle, measured in radians, may be larger than half of the sum of a divergence angle of radiation emanating from the waveguide, e.g. the waveguide exit angle of divergence, and the ratio of the maximum diameter of the waveguide radiation exit surface S, e.g. the waveguide aperture, over the focal distance of the ellipse.

In some embodiments according to the present invention, additionally a trade off is made for the aperture width. Depending on the aperture width, the diffraction angle will change. The smaller the aperture S, the larger the diffraction angle and thus the closer the grating lines must be in order to match a certain mode-size of for example an optical fiber. This means that the refocusing point of the reflection is very close to the entrance waveguide aperture, which is not beneficial for reflection reduction. On the other hand if the aperture width is increased, the diffraction angle will decrease and thus the grating lines can be placed further away from the aperture. In that case the refocusing point will thus be farther away from the entrance aperture, which is beneficial for the reflection reduction. In practice, a trade-off is made since increasing the aperture width will increase the possibility that there is reflected light captured back into the entrance waveguide (because the aperture width is larger).

The two dimensional grating 2 may be adapted for diffracting radiation, e.g. light, received from the waveguide 4 toward a direction forming an angle with a surface normal of the photonic substrate, e.g. a top surface of a photonic substrate slab in which the guiding portion 5 is embedded, larger than 0° for example at an angle of about 10° to the surface normal. The integrated photonics device 1 may furthermore comprise an optical fiber, optically connected to the planar guiding portion 5 in order to collect radiation directed from the waveguide 4 by the 2D grating.

When the two dimensional grating 2 is elliptically curved, i.e. comprises a plurality of curved elongate scattering elements 3, e.g. grating ridges, having an elliptical profile, coupling the radiation into the grating coupler along the direction of the long axes of these grating ridges may seem like the most logical choice. However, it has been found that deviating from this design may avoid a large back reflection since the reflection from the grating lines will be refocused to the second focal points, which for a waveguide not positioned along the long axis, results in reflected radiation being not coupled back into the waveguide.

In such a deviating design, another part of the confocal ellipses is used as grating coupler, or in other words, the waveguide is rotated over an angle different from 0° with respect to the long axe of the ellips, e.g. over an angle α being for example 45°. In this design the focal points and the grating are not inline hence the grating reflection is focused away from the entrance waveguide into a slab region, thereby fully eliminating the back reflection.

In an integrated photonics device 1 according to embodiments of the present invention the two dimensional grating 2 thus may focus the reflected light away from the entrance waveguide 4. The average reflectance may be reduced by 10 dB in such grating coupler compared to a similar conventional grating coupler, while the transmittance may remain at the same level.

In some embodiments according to the present invention, the angle between the waveguide and a major axis may be determined taking into account $$\Psi(r) \propto \int\int_{aperture} E_{inc}(x', y') \frac{e^{ik|r-r'|}}{4\pi|r-r'|} dx' dy',$$

whereby every point of the aperture, being the waveguide radiation exit surface, will act as a point source and $\Psi(r)$ is the field strength of radiation stemming from the exit surface S at position r. Integration is performed over the region of the aperture weighted by the field strength $E_{inc}(x',y')$ of the mode. Taking the above into account and simulating the diffraction as function of the waveguide width for an SOI rib waveguide, the following fit is obtained for the opening angle:

$$2\delta = \frac{1}{\sqrt{2}} \begin{pmatrix} -0.013W^6 + 0.193W^5 - 1.145W^4 + 3.490W^3 \\ -5.664W^2 + 4.287W - 0.194 \end{pmatrix}$$

with W the waveguide width. The half-power beam width (HPBW) was taken for fitting, in which case the diameter obtained is the full width of the beam at half its maximum intensity (FWHM).

The angle between the major axis and the longitudinal axis of the waveguide may in some embodiments be between 10° and 170°. In some embodiments, the angle may be between 25° and 155° or between 45° and 135°. The angle may depend on the aperture. The angle should be such that the reflected light does not coincide with the entrance waveguide. The optimal angle is thus where the angle between the incident light on the grating and the reflected light is maximal. This angle may be slightly different from 90 degrees. The exact angle depends on the distance between the focal points of the first grating line. For practical reasons such as waveguide routing, smaller angles can be preferred.

Theoretical working principles of the present invention will be discussed herebelow for the purpose of clarification. This elaboration of principles is however not intended to be construed as limiting the invention in any way.

As described hereinabove, two main sources may contribute to the back-reflection for grating couplers, namely second order reflection of the grating and Fresnel reflection at the grating coupler interface. In the grating coupler design according to embodiments of the present invention, these two sources of reflection may be focused away from the entrance waveguide, thereby extinguishing the reflection almost completely.

In particular embodiments of the present invention, the grating may be elliptically curved, i.e. may comprise a plurality of curved elongate scattering elements, e.g. grating ridges, having an elliptical profile. These grating ridges may form a set of such ellipses sharing the same orientation, i.e. having major axes orientated in the same direction, and sharing one focal point, which may preferentially coincide with an exit point of the waveguide, e.g. the geometrical center of the waveguide end surface, such as an interface surface where an integrated waveguide may couple light to an optically conductive region containing the grating. In similar systems known in the art, light may be coupled to the grating coupler, e.g. received from an integrated waveguide, e.g. a broad SOI waveguide, along the direction of the major axes of these grating ridges. The curvature of the grating is such that light, having a predetermined wavelength, received from the waveguide is diffracted in a predetermined direction out of the plane in which the grating is embedded. For example, in a direction where a tilted optical fiber may be optically connected to the substrate. This curvature of the grating is such that a plain wavefront originating from such a tilted optical fiber is phase-matched to the TE-polarized modes of a broad SOI waveguide, so that the wavefront is curved cylindrically and focusing occurs in the center of curvature of the wavefront.

Figure 2:
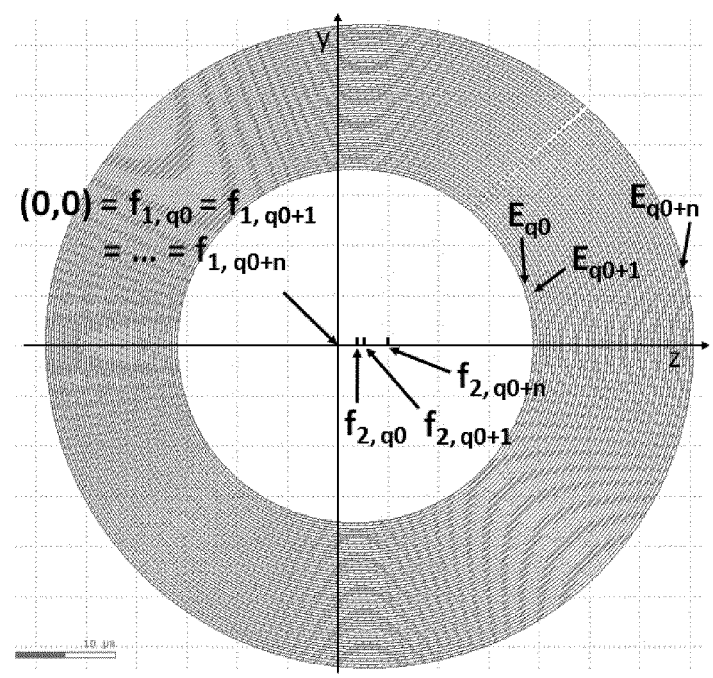
FIG. 2 shows an exemplary elliptically curved grating, as may be used in embodiments of the present invention.

Referring to FIG. 2, when the top surface of the waveguide is chosen to be the (Y,Z) plane of a right handed Cartesian coordinate system, with Z along the waveguide axis and the origin chosen to be at an exit point of the waveguide, the grating lines may be described by a set of confocal ellipses $E_{q0}, E_{q0+1}, \ldots, E_{q0+n}$ with the common focal point $f_{1,q0}=f_{1,q0+1}=\ldots=f_{1,q0+n}$ at the origin. In the described coordinate system, this set of ellipses may be described by:

$$\frac{\left(z - \frac{q\lambda_0 n_t \sin\theta}{n_{eff}^2 - n_t^2\sin^2\theta}\right)^2}{\left(\frac{q\lambda_0 n_{eff}}{n_{eff}^2 - n_t^2\sin^2\theta}\right)^2} + \frac{y^2}{\left[\frac{q\lambda_0}{(n_{eff}^2 - n_t^2\sin^2\theta)^{1/2}}\right]^2} = 1,$$

where q is an integer index number for each grating line, θ is the angle between the fiber and the chip surface normal, $n_t$ is the refractive index of the environment, $\lambda_0$ is the vacuum wavelength and $n_{eff}$ is the effective refractive index felt by a cylindrical wave in the optically conductive region containing the grating, e.g. the slab and grating area. The position of the second focal points is given by:

$$f_{2,q}(z, y) = \left(\frac{2q\lambda_0 n_t \sin\theta}{n_{eff}^2 - n_t^2\sin^2\theta}, 0\right).$$

Figure 3:
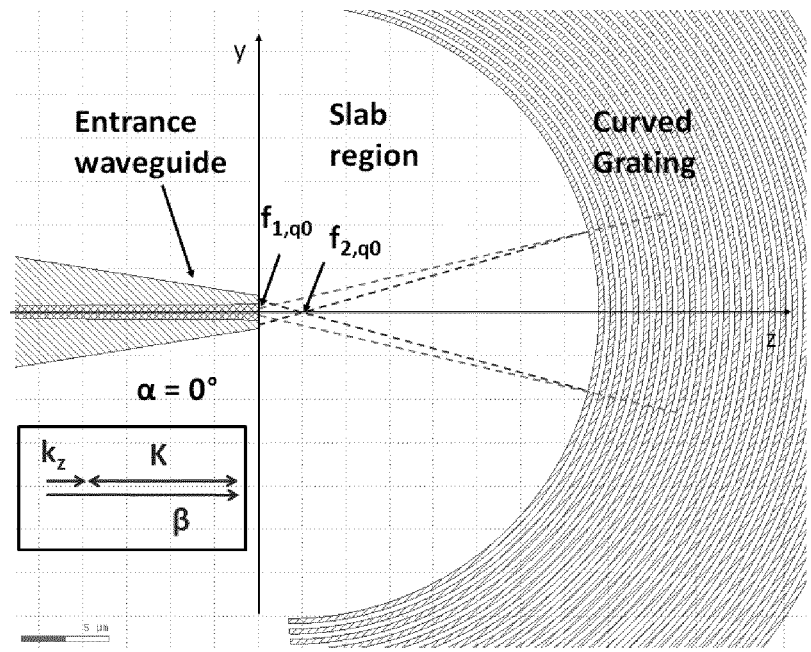
FIGS. 3 and 4 schematically illustrate a comparison between the reflection from the elliptically curved grating shown in FIG. 2, used in an axis-aligned waveguide (FIG. 3) and used in an off-axis waveguide, the latter according to an embodiment of the present invention, as well as the corresponding k-diagram for z=0.
Figure 4:
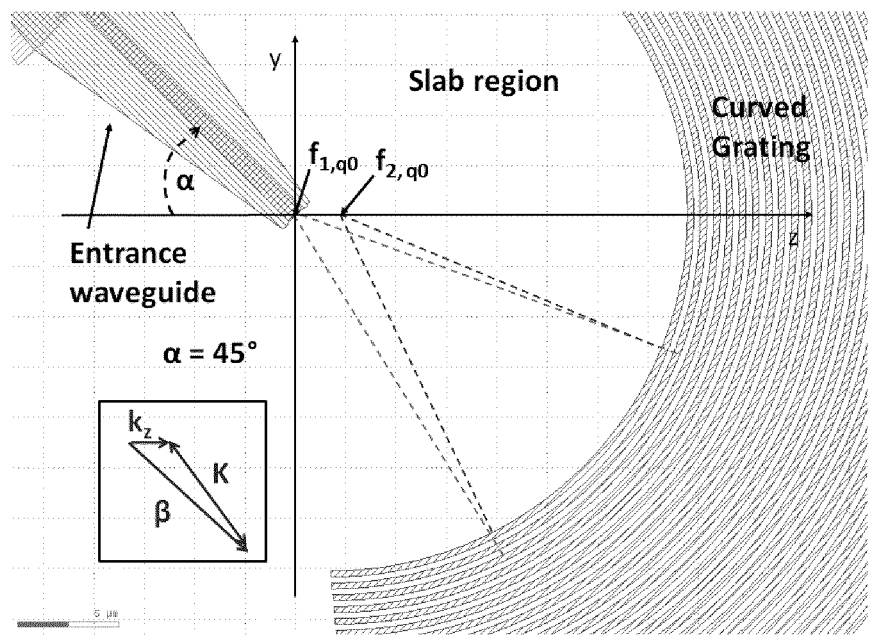

The phase-matching condition is fulfilled for all parts of the ellipses. Therefore, any part of the ellipses may be used for designing a grating coupler, because every part of the ellipse will couple out the light under the same angle θ. In conventional approaches known in the art, the part centered around the major axes of the ellipses, i.e. centered around the positive side of the z-axis in the introduced coordinate system, may be used, as shown in FIG. 3, such that the propagation vector $\vec{\beta}$ of the entrance waveguide is parallel to the projected wave vector $\vec{k}_{in,z}$ of the diffracted light, e.g. the waveguide angle α=0. Although this seems like a reasonable choice, it was found that this design may introduce maximum back-reflection, since the reflection from the grating lines will be refocused to the second focal points and coupled back into the entrance waveguide. According to embodiments of the present invention, this is avoided by using another part of such confocal ellipses as grating coupler, e.g. rotating the waveguide with an angle α, for example α=45°, with respect to the major axes of the ellipses, as illustrated in FIG. 4. In such a design, the focal points and the grating are not inline, and therefore the grating reflection is focused away from the entrance waveguide into a slab region, thus eliminating the back-reflection.

Several illustrative examples will be discussed further herebelow. These examples are intended to clarify modes of reduction to practice of the present invention, and are not intended to limit the invention in any way.

Figure 5:
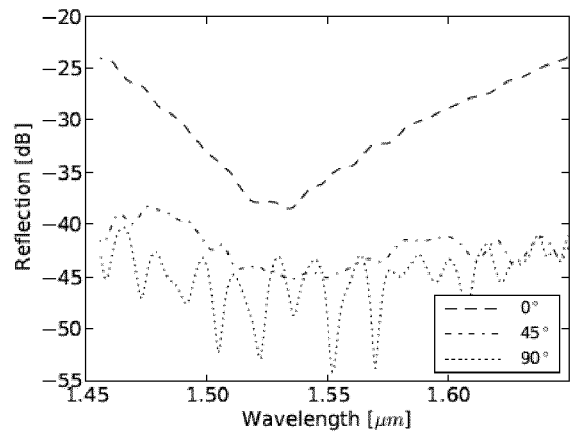
FIG. 5 shows simulated reflection spectra for shallow elliptically curved grating couplers, for different values of the waveguide angle, illustrating advantages of embodiments of the present invention.

In a first example, elliptical grating couplers according to embodiments of the present invention were simulated using full-vectorial 3D FDTD software, e.g. using the flexible, free-software package 'Meep' for electromagnetic simulations. To calculate the reflection spectra, a pulse with a Gaussian time profile was launched in a single-mode access waveguide and the reflected flux was measured in that same waveguide. FIG. 5 shows the reflection spectra of the grating coupler for different waveguide angles α with respect to the major axe for shallow etched gratings, i.e. 70 nm etch in a 220 nm Si core. The back-reflection, as can be observed in FIG. 5, decreases around 10 dB to 15 dB, i.e. to below −45 dB, near 1550 nm, thereby achieving typical back-reflection performance comparable to that of typical optical fiber connectors (−40 dB), without introducing a coupling efficiency penalty.

Figure 6:
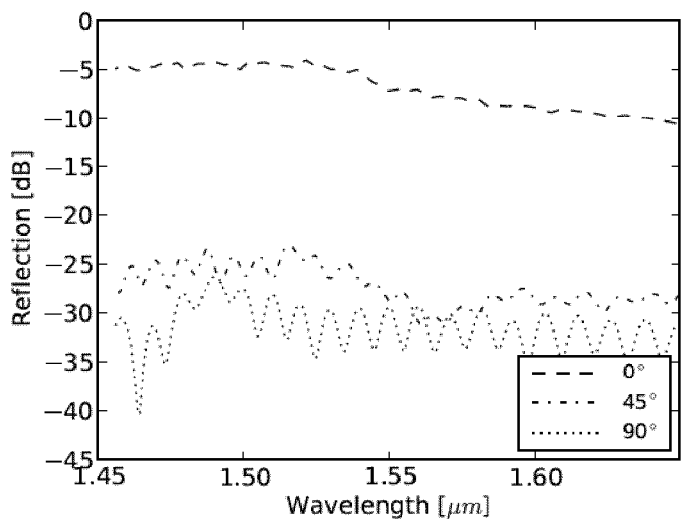
FIG. 6 shows simulated reflection spectra and fully etched elliptically curved grating couplers, for different values of the waveguide angle, illustrating advantages of embodiments of the present invention.
Figure 7:
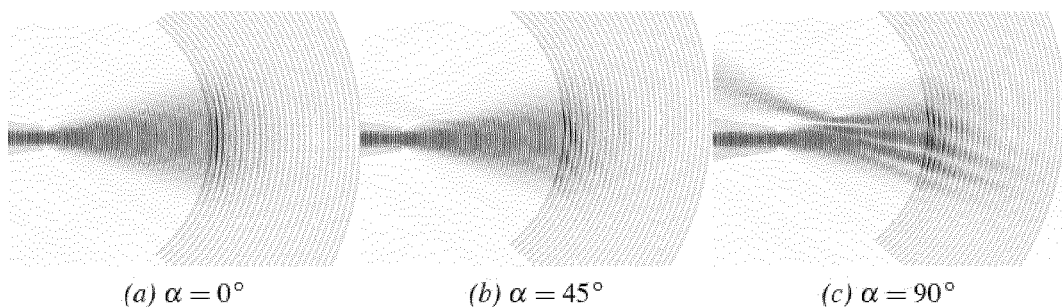
FIG. 7 shows cross-sections of the electric field for a shallow etched elliptically curved grating coupler for different waveguide angles, illustrating advantages of embodiments according to the present invention.

In FIG. 6, for fully etched gratings, i.e. in 220 nm Si core, the back-reflection is shown to decrease from −5 dB, corresponding to highly reflective gratings, to −25 dB. These gratings can be especially useful for integrated circuits. The coupling efficiency was calculated by exciting a single frequency continuous wave in the access waveguide and calculating the overlap between the optical field above the coupler and the mode profile of a single-mode fiber (ν≈15°, normalized to the power in the access waveguide. It was found that the substrate-less shallow etched design had a coupling efficiency of 33% independent of the waveguide angle α.

In a second illustrative example, an array of elliptical gratings on SOI is used to couple an optical field between a single-mode waveguide and a single-mode fiber. Since the phase-matching condition of the curved gratings is fulfilled for all parts of the confocal ellipses, the longitudinal axis of the entrance waveguide with respect to the long axe of the ellipses may be tilted by α in order to use another part of the grating for coupling. For α>>0, reflections may be refocused away from the entrance waveguide, and less reflection will be coupled back into the entrance waveguide.

Figure 8:
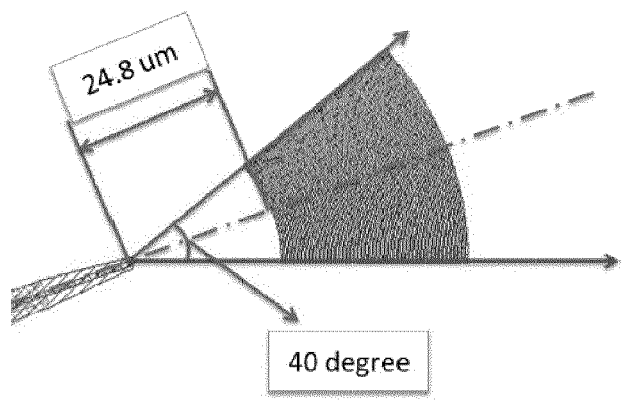
FIG. 8 illustrates an exemplary test grating coupler having an azimuthal angle of 20° between the waveguide and the elliptical curved grating, illustrating another example of an embodiment according to the present invention.
Figure 9:
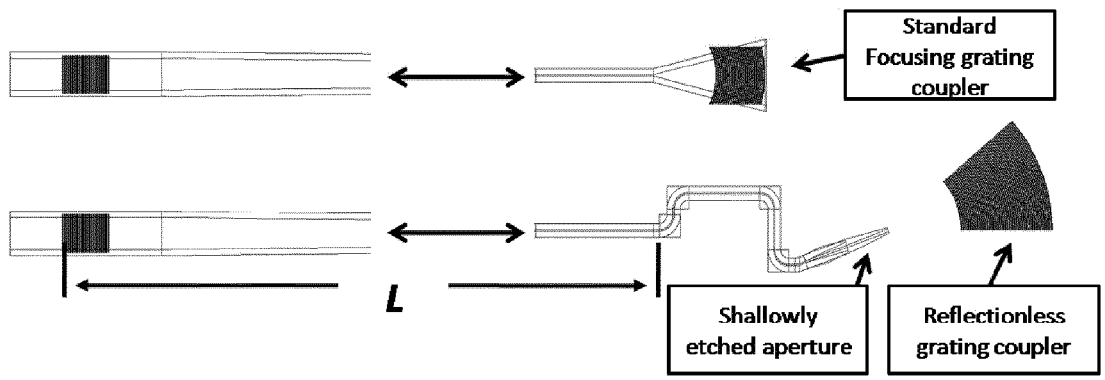
FIG. 9 shows two different structures used in an experimental setup for comparison, being a prior art grating coupler (top) and a grating coupler according to embodiments of the present invention (bottom).

A grating coupler on SOI according to embodiments of the present invention with an azimuthal angle α=20° is shown in FIG. 8. This grating coupler was fabricated with 193 nm DUV lithography. The top silicon layer had a height of 220 nm, and the curves in the grating region were shallowly etched trenches with a silicon thickness of 150 nm. No cladding was covered on top of the grating. The distance from the entrance waveguide to the first grating was 24.8 μm, and the divergence angle of the gratings was around 40°.

To reduce reflections, the deeply etched entrance waveguide was tapered to a shallowly etched aperture. The width of the aperture was set as 0.9 μm to make sure that the light reaching the grating was mode matched with the mode in a single mode fiber. The entrance waveguide was connected to a standard grating coupler from the left side, as shown, via a 2 mm long taper. A normal focusing grating coupler with the same input grating coupler and taper was fabricated to compare with the grating coupler. The separation between the normal grating coupler and the input grating coupler was L=2.04 mm. The four bends with 5 mm radii in the grating coupler test structure corresponding to the embodiments of the present invention were used to mark the distance L. Both of the grating couplers were designed to perform at 1.55 μm.

Light from a tunable laser, scanning from 1490 nm to 1570 nm with a step of 20 μm, was sent to the input standard grating couplers from a single mode fiber pigtail. Another fiber was aligned to the right-side grating couplers to measure the transmission spectra. The transmission maxima for both test grating couplers were within 1540 nm and 1550 nm as expected. Their insertion losses (around −10 dB) and 3 dB bandwidths (50 nm) were also in the same level.

The reflections were extracted by means of a circulator. To avoid additional reflections, the right-side fiber pigtail was removed in the reflection measurement. The space domain reflection information could be extracted from the autocorrelation functions of the reflected spectrum. Three steps were performed before calculating the autocorrelation: 1. A first step of converting the reflection spectra from the wavelength domain to the frequency domain, using the linear interpolation function. 2. A second step of multiplying a Gaussian window to the reflections in the frequency domain, so as to suppress numerical leakages. 3. A third step of zero padding, in order to get a denser frequency mesh in the autocorrelation function, which is good for estimating the 3 dB bandwidth of peaks. The autocorrelation $R(z)$ was thus obtained by doing the inverse Fourier transformation to the prepared reflection spectrum. The group index used in the calculation was the average group index along the taper, which was estimated as 3.75. The autocorrelation of a reference reflection spectrum, which was measured by shining the laser directly to an empty area (with no patterns) on the same chip, was also calculated for comparison. The calculated reflectance was an average value for wavelengths between 1490 nm and 1570 nm.

Figure 10:
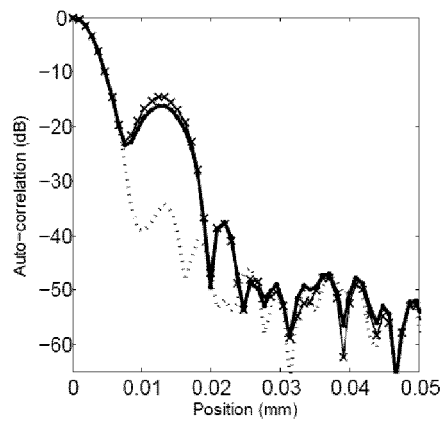
FIG. 10 shows a detail view of a peak in the autocorrelation functions of the reflected signals from three different test structures due to reflections on the input grating coupler, illustrating features and advantages of embodiments according to the present invention.
Figure 11:
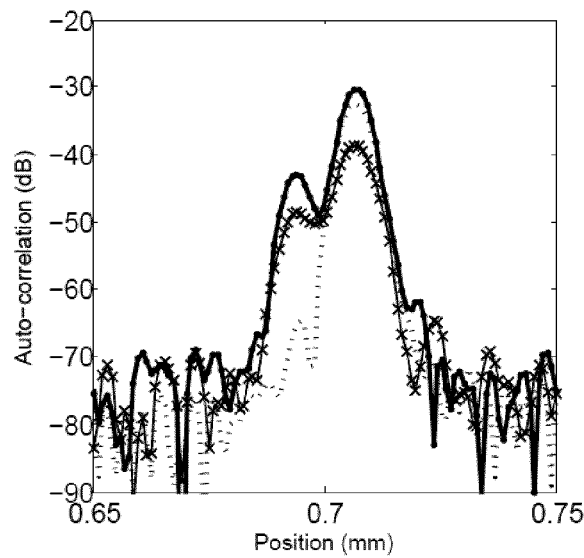
FIG. 11 shows a detail view of a peak in the autocorrelation functions of the reflected signals from three different test structures due to reflections on the chip bottom.
Figure 12:
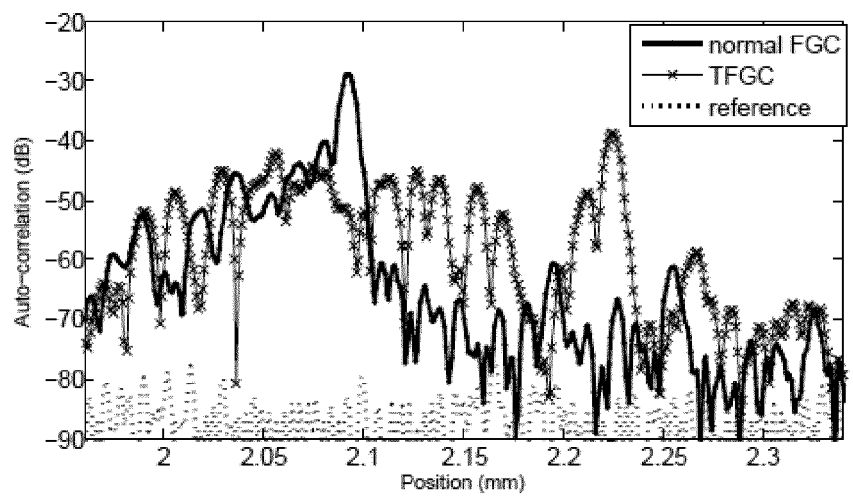
FIG. 12 shows a detail view of a peak in the autocorrelation functions of the reflected signals from three different test structures due to reflections on the right-side grating couplers.

Interferences between the field reflected from the fiber-air interface and the spatial distribution of field reflected along the test structures could be extracted from the peaks appearing in the autocorrelation functions. The first peak near z=15 μm was caused by the interference between reflections from the fiber-air interface and those from the input grating coupler, shown in FIG. 10. Since there was no input grating coupler in the reference measurement, this peak did not appear in the reference curve. Another peak appeared for z≈0.71 mm, which is found in all autocorrelation curves. It was caused by the interference between reflections from the fiber-air interface and those from the chip bottom, shown in FIG. 11. The peak for z≈2.1 mm was caused by the interference between the reflections from the fiber-air interface and those from the test grating couplers, and thus it did not appear in the autocorrelation of the reference measurement, see FIG. 12. It may be found that the peak of the grating coupler according to embodiments of the present invention is lower than that of the prior art grating coupler. Reflectance integrated over the 3 dB linewidth of the peaks illustrates that the average reflectance of the grating coupler according to embodiments of the present invention is 9.5 dB less than that of the conventional grating coupler. Reflectance from the four bends in the test structure was also quite large as is shown in FIG. 12.

In the grating coupler according to embodiments of the present invention with an azimuthal angle (angle between waveguide longitudinal axis and the long axis) of 20°, the average reflectance between 1490 nm and 1570 nm was 9.5 dB less than that of the prior art focusing grating coupler, while its transmittance was not reduced. According to the simulations, e.g. as illustrated in FIG. 5 and FIG. 6, increasing the azimuthal angle may further reduce the reflections.

In a second aspect, the present invention relates to an optical system for guiding radiation to or from a photonic integrated device. The optical system comprises a photonic integrated device according to an embodiment of the first aspect. It is in optical communication with an optical fiber. The fiber thereby may be optically connected to the photonic integrated device. Further features and advantages may be as described with reference to the first aspect.

In a third aspect, the present invention relates to a method for coupling radiation from a waveguide embedded in a photonic integrated device out of the photonic integrated device or towards the photonic integrated device. The method comprises directing radiation received from the waveguide through a waveguide radiation exit surface toward a two dimensional grating. The two dimensional grating thereby is adapted for diffracting the radiation received from the waveguide towards a direction out of said device, and the two dimensional grating comprises a plurality of curved elongate scattering elements which are oriented with respect to the waveguide such that, for points of the scattering elements which can be irradiated by radiations stemming from the waveguide, normal lines to the curved elongate scattering elements do not intersect with said waveguide radiation exit surface of said waveguide. The method also comprises coupling the radiation out of said photonic integrated device using the two dimensional grating.

In a further aspect, the present invention also relates to the use of a photonic integrated device as described in the first aspect, for guiding radiation to or from a waveguide in the photonic integrated device. Further features and advantages of the photonic integrated device and the use thereof may be as indicated in the aspects above.

Further by way of illustration, embodiments not being limited thereto, design rules for designing reflectionless grating couplers according to at least some embodiments of the present invention are discussed below, whereby the design is also investigated by means of 3D FDTD simulations for the case of a silicon-on-insulator based platform.

Figure 13:
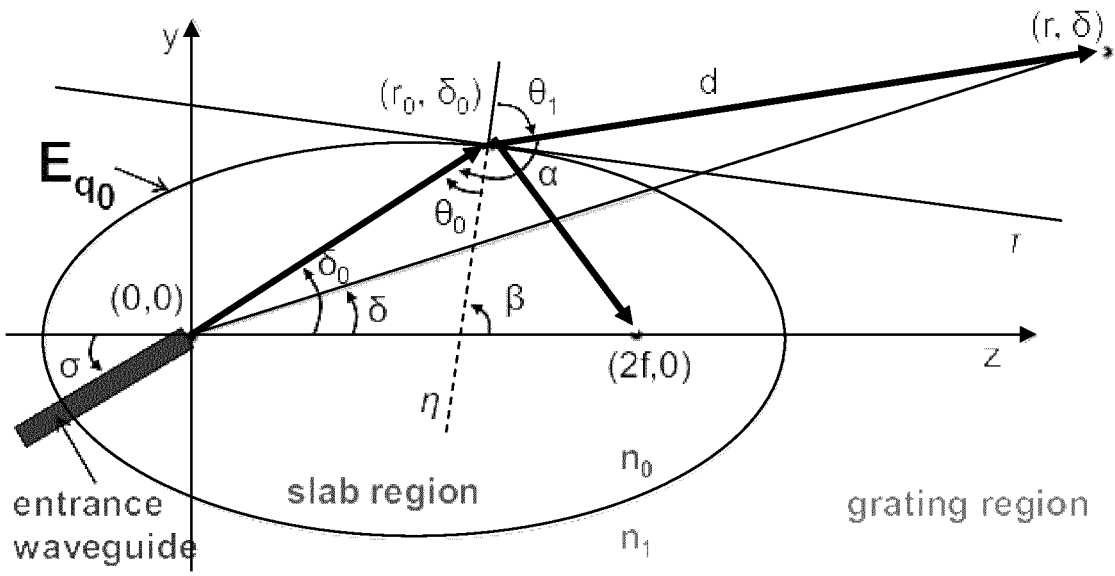
FIG. 13 illustrates the focusing grating coupler geometry parameters as used in an example for describing exemplary design rules, as can be used in an embodiment of the present invention.

For the reflectionless grating coupler of the present example, the following design rules are followed. The grating is curved such that a plain wavefront originating from the tilted optical fiber is phase matched to the TE polarized mode of a broad SOI waveguide, so that the wavefront is curved cylindrically and focusing occurs in the center of curvature of the wavefront. The light is refracted and reflected at the first grating ellipse $E_{q0}$. $\tau$ and $\eta$ are the tangent and normal line respectively of ellipse $E_{q0}$ at point $(r_0, \delta_0)$. The easiest way to describe this system is to use a polar coordinate system $(r, \delta)$ with the origin placed at the exit point of the entrance waveguide, as shown in FIG. 13. The beam will expand in the slab region with an effective refractive index $n_s$ and after a certain length $r_0$ it will encounter the grating, thereby experiencing a different effective refractive index $n_g$. As a first approximation we suppose that these effective refractive indices $n_s$ and $n_g$ are equal and thus $\alpha=180°$. The phase matching condition is now:

$$q\lambda_0 = rn_s - r\cos\delta n_c \sin\phi$$

where $\lambda_0$ is the vacuum wavelength and q is an integer number corresponding with each grating line. The fiber is tilted under an angle $\Phi$, the angle between the fiber and the chip surface normal, such that the projected propagation constant of the fiber only has a z-component proportional to $n_c \sin \Phi$ where $n_c$ is the refractive index of the top cladding. By rewriting the above equation one can see that the grating lines will form confocal ellipses $E_{q0}, E_{q0+1}, \ldots, E_{q0+n}$:

$$r = \frac{\frac{q\lambda_0}{n_s}}{1 - \frac{n_c \sin\phi \cos\delta}{n_s}} = \frac{a(1-e^2)}{1-e\cos\delta}$$

with a common focal point $f_{1,q}$ at the origin. From this we can determine the eccentricity $$e = \frac{n_c \sin\phi}{n_s},$$

semi-major axis $$a = \frac{q\lambda_0 n_s}{n_s^2 - n_c^2 \sin^2\phi}$$

and second focal points $$f_{2,q} = \frac{q\lambda_0 n_c \sin\phi}{n_s^2 - n_c^2 \sin^2\phi}.$$

Figure 14:
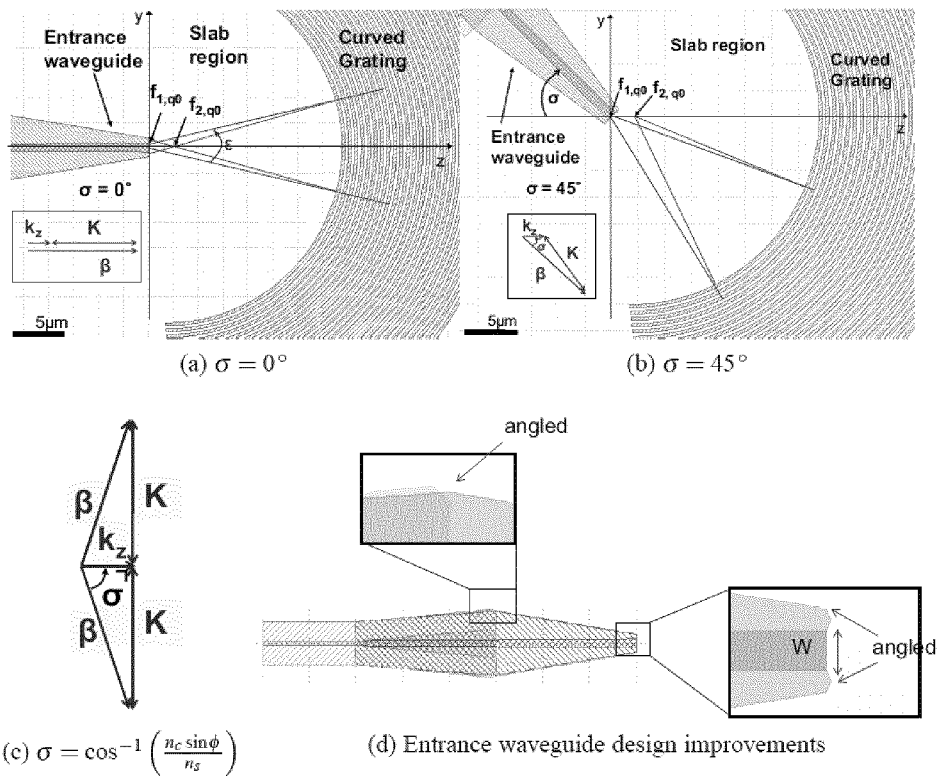
FIG. 14 illustrates reflection from curved grating couplers for different waveguide angles, as used in embodiments of the present invention.

The first grating line corresponds to $q_0$. The phase matching condition is fulfilled for all parts of the confocal ellipses. We can thus choose which part of the ellipses we use for designing a grating coupler because every part of the ellipse will couple the light out under the same angle $\Phi$. Normally one takes the right part of the confocal ellipses as shown in FIG. 14a, such that the propagation vector $\vec{\beta}$ of the entrance waveguide is parallel to the projected wave vector $\vec{k}_z = (2\lambda/\lambda)n_c \sin\Phi \cdot \vec{e}_z$, of the diffracted light (waveguide angle $\sigma=0°$). Although this seems like the most logical choice, this design will introduce the largest back reflection in the waveguide since the reflection from the grating lines will be refocused to the second focal points $f_{2,q}$ and coupled back into the entrance waveguide. This is solved by using another part of the confocal ellipses as grating coupler and rotating the waveguide by an angle $\sigma$ of for example 45°, see FIG. 14b. In this design the focal points and the grating are not inline hence the grating reflection is focused away from the entrance waveguide into a slab region, thereby fully eliminating the back reflection. In FIG. 14c the angle $\sigma$ is illustrated for the optimal reflection waveguide angle and second order reflection angle and in FIG. 14d the entrance waveguide design is illustrated.

To obtain the appropriate first grating line number $q_0$, we calculate the in plane aperture opening angle $\epsilon$ of the entrance waveguide using a 3D mode propagation tool. This angle will determine the focusing length of the slab $r_0$ and thus $q_0$ such that the width of the diffracted beam matches the width of the Gaussian fiber mode. It can be shown that this focusing length has no influence on the grating coupler performance and can be chosen freely. However, in the reflectionless grating coupler design, the larger the focusing length, the larger is the distance from entrance waveguide to the closest focal point $f_{2,q0}$ whereto the reflected light is refocused, thereby minimizing the reflection coupled back into the entrance waveguide. On the other hand, a larger focusing length is accompanied by a broader waveguide aperture and thus a larger chance to recapture reflected light back into the entrance waveguide. Depending on the exact entrance waveguide geometry, a proper waveguide width should be chosen. There exists a waveguide angle $\sigma$ of the entrance waveguide for which the angle between the incident light and the reflected light is maximal. This optimal reflection waveguide angle $$\sigma = \cos^{-1}\left(\frac{n_c \sin\phi}{n_s}\right)$$

is derived by maximizing the reflection angle $\theta_0(\delta_0)$ given by $$\theta_0 = \beta - \delta_0 = \frac{\pi}{2} + \tan^{-1}\left(\frac{n_c \sin\phi}{n_s \sin\delta_0} - \cot\delta_0\right) - \delta_0$$

Figure 15A:
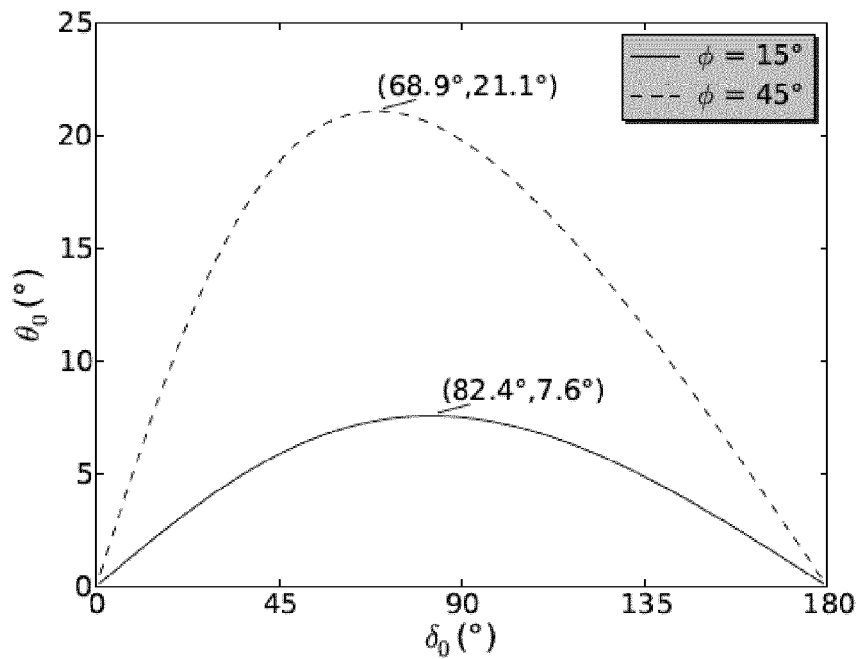
FIG. 15a and FIG. 15b show the reflection angle as a function of $\delta_0$ (FIG. 15a) and the optimal entrance waveguide angle and corresponding $\theta_0$ as a function of t, as can be used in embodiments of the present invention.
Figure 15B:
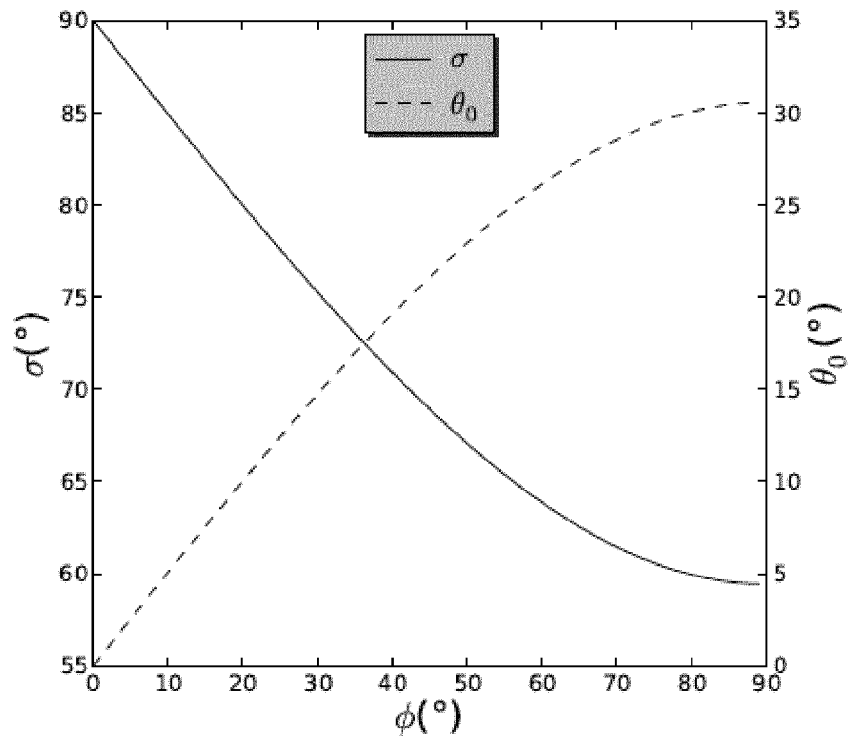

FIG. 15a shows $q_0$ as a function of $\delta_0$ for a fiber angle $\Phi$ of 15°, wavelength $\lambda_0=1.55$ μm, $SiO_2$ cladding ($n_c=1.45$) and $n_s=2.852$ corresponding to the effective index of the TE slab mode propagating in an SOI slab with a 220 nm thick Si core surrounded by $SiO_2$. The optimal entrance waveguide angle $\sigma=\delta_{0,max}$ for these parameters is 82.4° and 68.9° for a fiber angle $\Phi$ of 15° and 45° respectively. In FIG. 15b the optimal reflection waveguide angle and the corresponding reflection angle $\theta_0$ are plotted as a function of the fiber tilt angle $\Phi$. We can conclude that a larger fiber tilt results in a larger reflection angle $\theta_0$ and thus accordingly lower back reflection. A larger fiber tilt will also reduce the second order back reflection (case $\sigma=0°$) from the grating. However, for practical reasons one typically chooses a tilt angle $\Phi$ between 5° and 20°.

Dealing with ultra-low reflections means that even the smallest reflection will have a significant contribution to the overall reflection. Reducing every possible reflection source is thus very crucial. One important source of parasitic reflections is due to discontinuities such as at the exit of the entrance waveguide. These can be minimized by angling the trenches as is shown in FIG. 14d.

The grating reflected and refocused light can be reflected back onto the grating and thus back into the waveguide. Therefore we also need to make sure that the reflected light is not normally incident on any feature.

Another improvement is to differentiate between the effective refractive index of the grating $n_g$ and the effective refractive index of the slab region $n_s$ (see FIG. 13). The phase matching condition for the first grating line corresponding to $q_0$ will stay the same. At this first grating line, the light will transition from a slab with refractive index $n_s$ to a grating region with refractive index $n_g$ and thus be refracted at this interface under an angle $$\theta_1 = \sin^{-1}\left(\frac{n_s \sin\theta_0}{n_g}\right)$$

according to Snell's law. The angle between the incoming beam and refracted beam is thus $\alpha=\pi+\theta_0-\theta_1$. Solving the phase condition numerically $$q\lambda_0 = r_0 n_s + dn_g - r \cos \delta n_c \sin \phi$$

together with the system of geometric equations $d^2=r_0^2+r^2-2r_0 r \cos(\delta_0-\delta)$ and $r^2=r_0^2+d^2-2r_0 d \cos \alpha$ for every refraction point $(r_0, \delta_0)$ to $(r, \delta)$ will result in the subsequent grating lines for $q \geq q_0+1$.

Figure 16A:
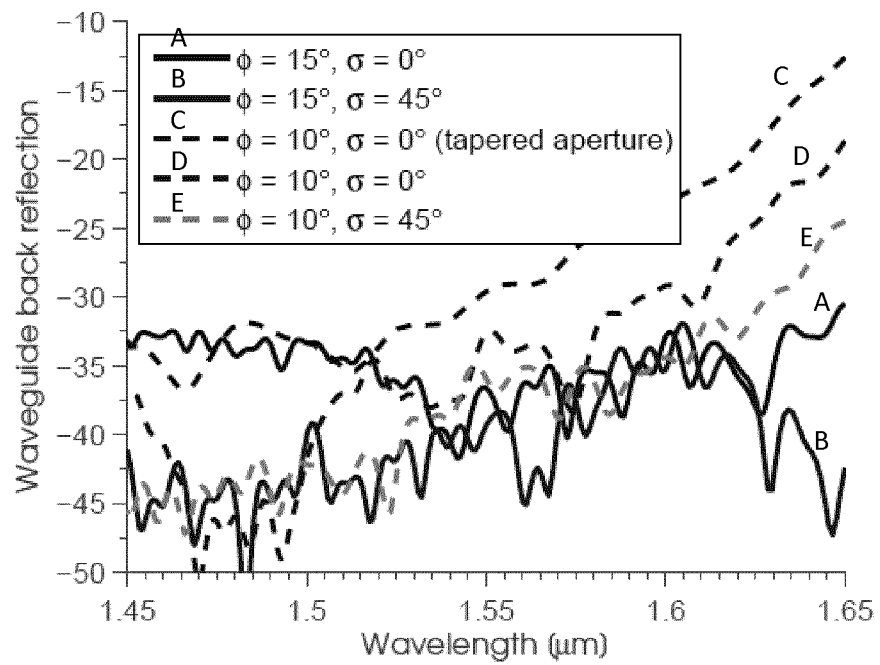
FIG. 16a and FIG. 16b show the reflection spectra for shallow and fully etched grating couples, each time for different values of the waveguide angle σ and fiber tilt angle Φ, as can be obtained using embodiments of the present invention.
Figure 16B:
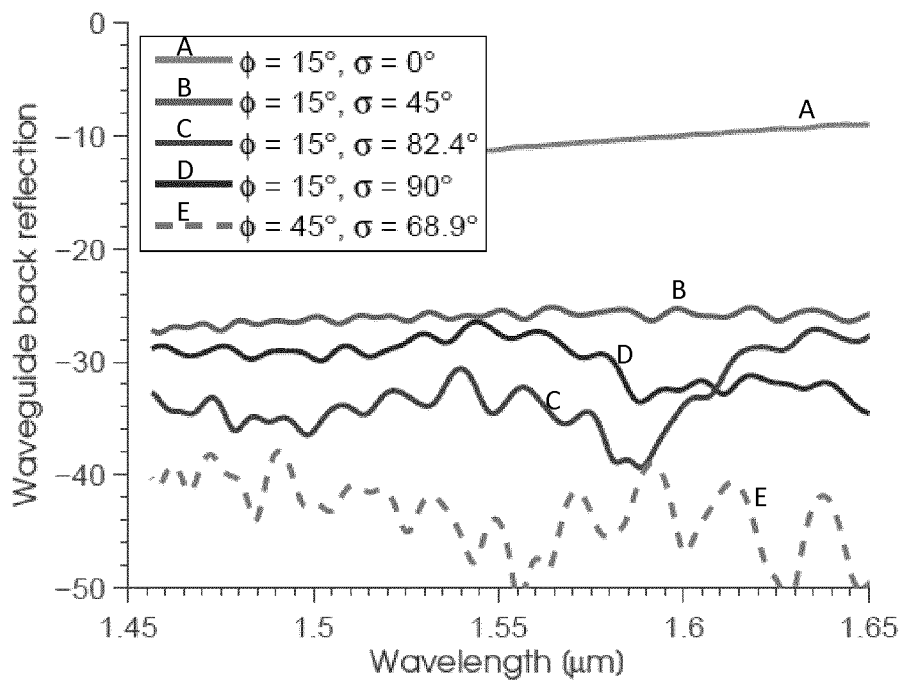

The grating couplers, designed as described above, were simulated using full-vectorial 3D FDTD software. To calculate the reflection spectra, a pulse with a Gaussian time profile was launched in the single-mode access waveguide and the reflected flux was measured in that same waveguide. The coupling efficiency was simulated by the normalized power in the single-mode waveguide after launching a Gaussian mode under the correct angles and polarization. It was found that the optimal reflection waveguide angle does indeed have the lowest back reflection, but it also has the lowest coupling efficiency. This is because this waveguide angle corresponds to the angle for second order Bragg reflection (case $$\sigma = \cos^{-1}\left(\frac{n_c \sin\phi}{n_s}\right)$$

when $\vec{K} \cdot \vec{k}_z = 0$ (see FIG. 14c). FIGS. 16a and 16b show the spectra of the reflection back in the entrance waveguide of the proposed grating coupler for different waveguide angles σ. For the shallow etched gratings (70 nm etch in a 220 nm Si core) and for fiber tilt angle Φ=10°, the second order back reflection present at the higher wavelengths decreases around 5 dB to 10 dB for waveguide angles up to 45° without coupling efficiency penalty (typical grating coupler efficiency is around 30%). We see that mainly the second order reflection (case σ=0°) present at the higher wavelengths is reduced. This second order reflection can be easily reduced by increasing the fiber tilt angle to 15° and even more using the novel grating coupler design. The reflection reduction is the most pronounced in the case of fully etched grating couplers (220 nm Si core) having a typical efficiency around 10%. The back reflection decreases from −7 dB to −28 dB for σ=45°.

The above illustrates that the reflection in grating couplers could be decreased down to −40 dB, thereby realizing the same back reflection performance of a typical optical fiber connector, without introducing a coupling efficiency penalty. Furthermore, it was shown that this method can be used to reduce the reflection of highly reflective (−7 dB) grating couplers to useful reflections of −28 dB. The devices according to embodiments of the present invention can be applied in a plurality of applications, including in interferometer based designs and circuits using integrated lasers and amplifiers.

By way of illustration, experimental data illustrating advantages of methods and systems according to embodiments of the present invention are further discussed below, embodiments of the present invention not being limited thereto.

In one design used in the present example, a focusing grating coupler is used wherein the coordinates of the trenches are defined by $$r(q,\alpha) = q\lambda_0/(n_g - n_c \sin\phi \cos\alpha)$$

where $r(q,\alpha)$ is the radius of each position of the gratings, α is the azimuths, $q \in N$ is the index of the gratings, $\lambda_0$ is the wavelength of the light in vacuum, Φ is the angle between the fiber and the normal direction of the chip, and $n_g$ and $n_c$ are the effective indices of the grating region and the top cladding material, respectively.

These curves turn out to be an array of ellipses with the same position of the first focus points $f_{1,q}$, and the same value of eccentricity $e = n_c \sin(\Phi)/n_g$. The entrance waveguide has its end located on the first focus point.

Figure 17:
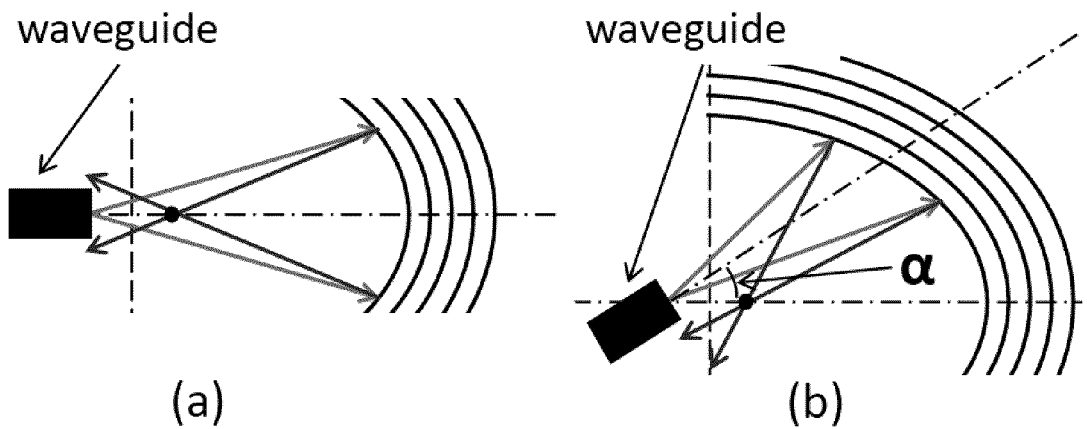
FIG. 17 describes the tilted focusing grating couplers with different azimuths illustrating the incoming light from the waveguide and the Fresnel reflections on the boundaries, as can be used in embodiments of the present invention.

In standard and focusing grating couplers, two types of reflections may be introduced: the second order reflection and Fresnel reflection. The tilted angle of the fiber t is often set as 10° or 15° to make sure that the second order reflection is not excited. However, the Fresnel reflections at the boundary between the slab and grating regions can still be sent back to the entrance waveguide. To avoid these reflections, embodiments of the present invention make use of grating regions with α different from 0°. This is done by tilting the entrance waveguide with a certain angle, as can be seen in FIG. 17b. For light coming from the entrance waveguide located at the first focus point of the ellipses, the Fresnel reflection from the first ellipse will be directed to the second focus point rather than the first one. With the tilted entrance waveguide, less reflections will be sent back to the waveguide. The optimal rotation angle of the entrance waveguide can be determined by simulation and it was determined that for a wavelength range near 1550 nm the average reflection can be reduced by 10 to 15 dB with α=π/4.

Figure 18:
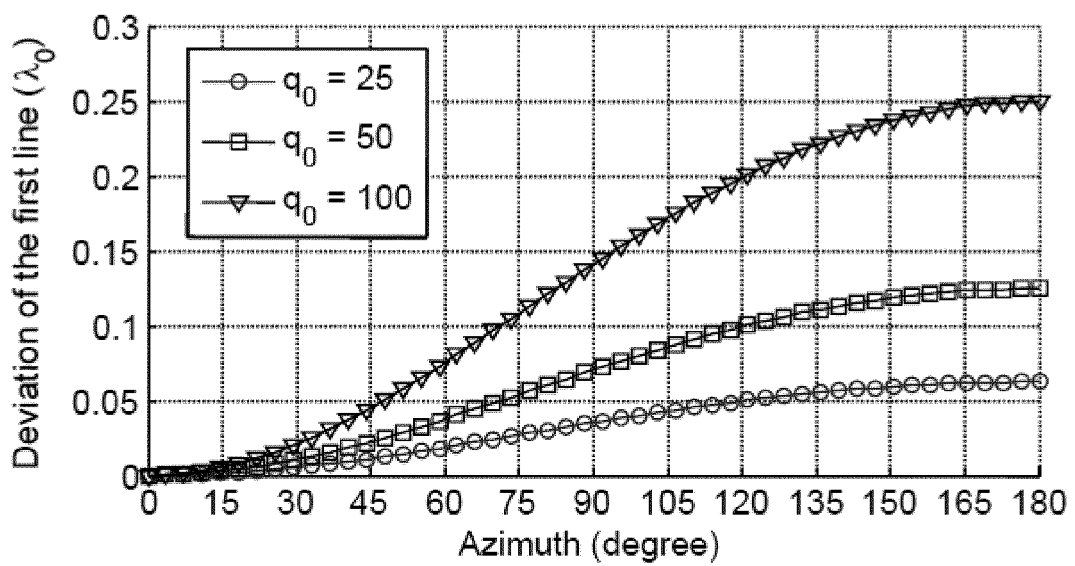
FIG. 18 illustrates the radius deviations of gratings for different FGC designs, according to an embodiment of the present invention.

For the above mentioned values it was assumed that the effective index values of the slab region $n_s$ and the grating regions $n_g$ are the same, which is however not true. The errors caused by the effective index estimation may have a big impact on gratings with large α. Considering the effective index difference, a more general equation describing usable trenches is written as $$r(q, \alpha) = \frac{(q-q_0) \cdot \lambda_0}{n_g - n_c \sin\phi \cos\alpha} + p(q_0, \alpha),$$

with $$p(q_0, \alpha) = \frac{\kappa q_0 \lambda_0}{n_s - n_c \sin\phi \cos\alpha},$$

where $q_0 \in N$ is the index of the first line, $\kappa \in R$ is a factor to define the distance of the first line in the grating. The radius deviations from the old design are shown in FIG. 18, in which κ was chosen as $$\frac{n_s - n_c \sin\phi}{n_g - n_c \sin\phi}$$

so that r(q₀,0) is the same as the old design. It can be seen that the maximal deviations are not very large for small q values. As a result, the old formula can be used in most cases for the grating coupler designs. In the above equation for $r(q, \alpha)$, the diffractions on the boundaries between the slab and grating regions are not considered, and the effective indices of the grating regions are set as the same value. It is suitable for grating couplers with a small fiber angle $\Phi$. For the design with $\Phi=10°$, $\lambda_0=1550$ nm and $n_c=1$, the maximal deviation is only 2% of the wavelength, and thus can be omitted. If the diffractions and the effective index variations in the grating region cannot be omitted, a numerical method is to be used.

Figure 19:
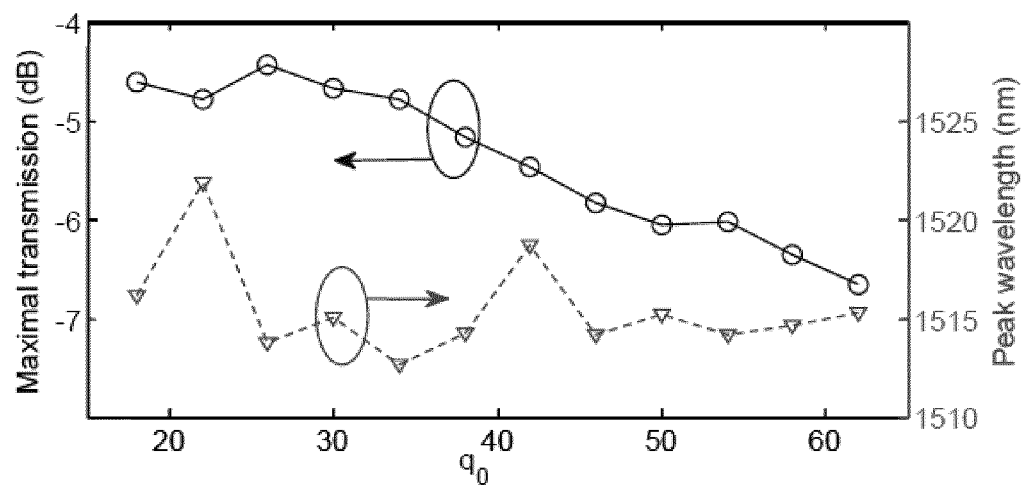
FIG. 19 shows the maximal grating coupler to fiber coupling efficiency for different $q_0$ value when the width of the entrance waveguide aperture is set as 0.9 μm, as can be used in an embodiment of the present invention.
Figure 20:
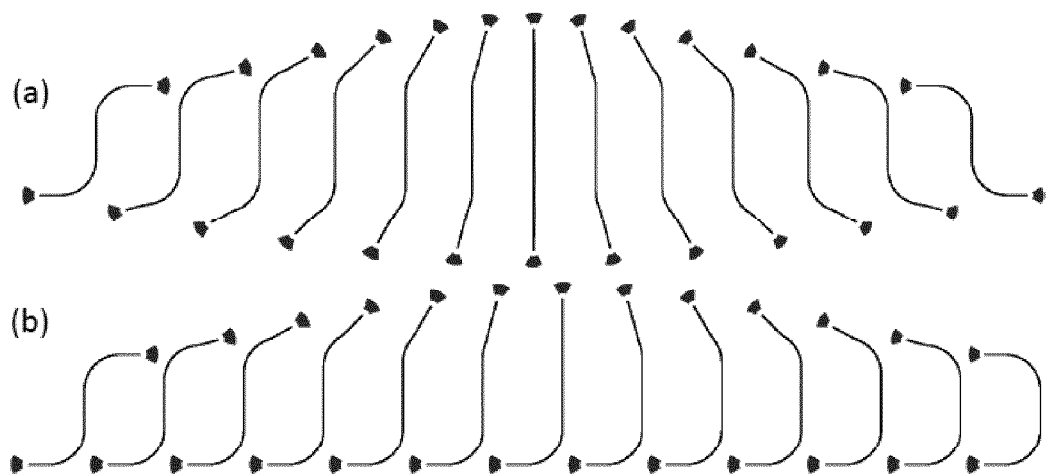
FIG. 20 shows the grating couplers with different azimuths (a) wherein in each sample the input grating coupler is the same as the output grating coupler and (b) wherein in each sample the input grating coupler always has α=0, illustrating features of embodiments of the present invention.

Curved grating couplers (shown in FIG. 20) with different α are fabricated using deep UV 192 nm lithography. The designs were made for coupling light with 1550 nm wavelength. The cladding on top of the gratings is air. The width of the entrance waveguide aperture was set as 0.9 μm. In order to have the best mode matching between the grating and a single mode fiber, a series of grating couplers (α=0° with a scan of $q_0$ was designed and measured. The maximal transmission efficiencies and the corresponding wavelengths are plotted in FIG. 19. It is found that the best $q_0$ is 26.

Figure 21:
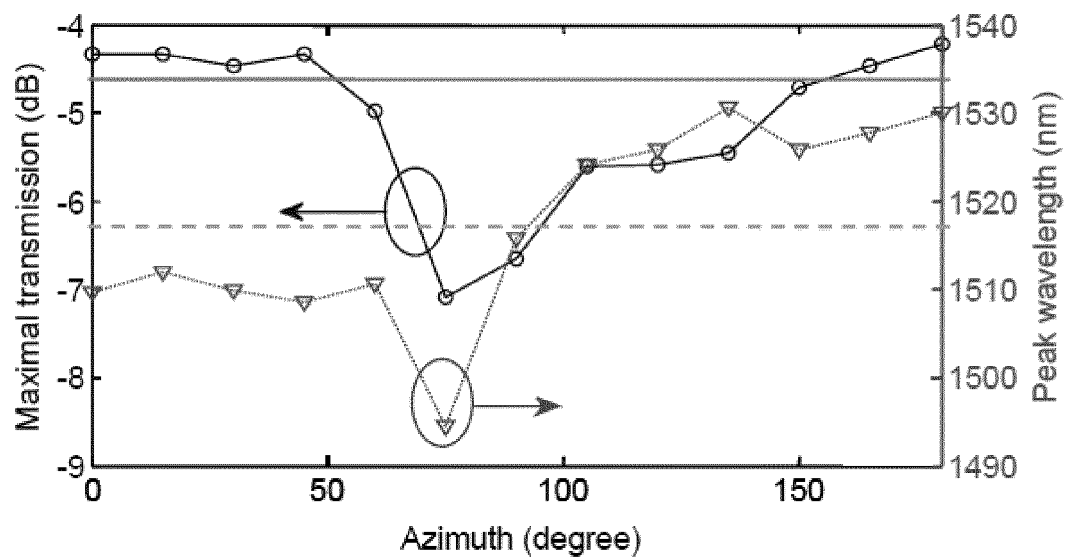
FIG. 21 illustrates the maximal transmission efficiencies and the corresponding wavelengths of the grating couplers.

The transmission of the grating couplers in FIG. 20(a) in the wavelength range between 1490 nm and 1570 nm were measured. Due to fabrication problems, the wavelengths for the maximal transmissions are shifted to lower values, which can be more clearly seen in FIG. 21. The solid and dotted horizontal bars in FIG. 21 stand for the maximal transmission efficiency (−4.6 dB) and the corresponding wavelength of a standard grating coupler (1517 nm). For grating couplers with α near 180°, the transmission 1 dB bandwidth values are around 43 nm. For α near 90°, the transmission band becomes strange, and this is due to the wrong estimations of the effective index of the grating ($n_g$) and the fiber angle ($\Phi$). The minimal 1 dB bandwidth is 28 nm for α=60°.

Figure 22:
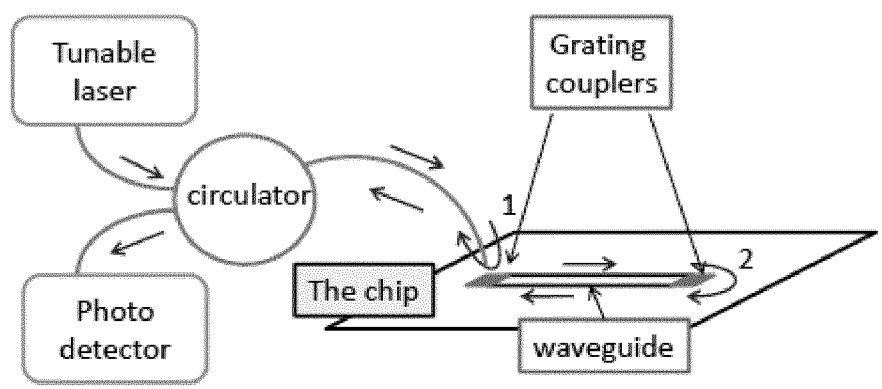
FIG. 22 illustrates the setup used to measure reflections, as used in experiments, illustrating features of embodiments of the present invention.

The reflections were measured by a simplified optical frequency domain reflectometry (OFDR). The measurement setup is schematically shown in FIG. 22.

A circulator is used to retrieve the reflections from the fiber end facet and reflections from the chip to the detector. By sweeping the wavelength of the tunable laser with a wavelength step of 20 pm, the reflection spectrum is measured. The postprocessing is done in a computer, where the spatial distribution of the reflection is calculated from the autocorrelation R(z) of the detected signals. Three steps were done before calculating R(z):
1. mapping the reflection spectra from the wavelength domain to the frequency domain, using the linear interpolation function.
2. multiplying a Gaussian window to the reflections in the frequency domain, so as to suppress numerical leakages.
3. zero padding, in order to get a denser frequency mesh in the autocorrelation function, which is good for estimating the 3 dB bandwidth of peaks.

Figure 23:
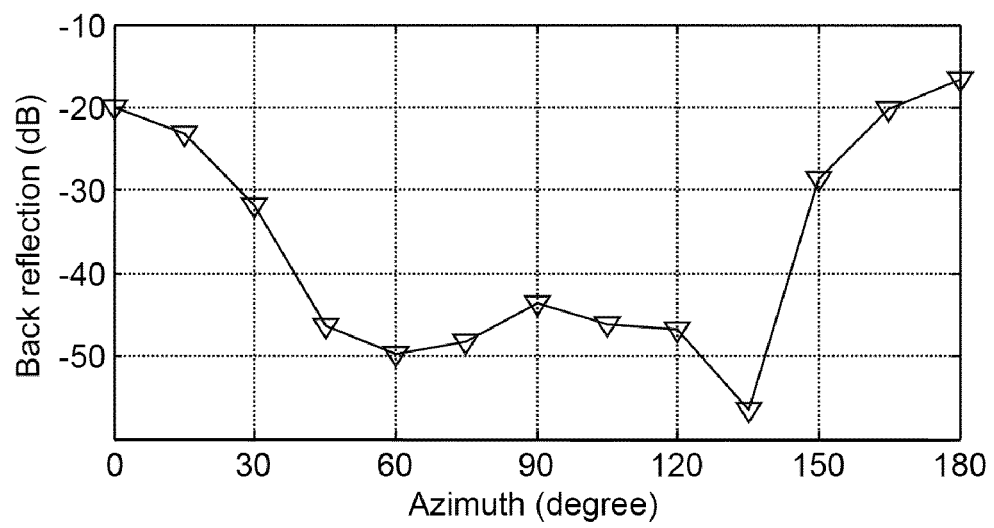
FIG. 23 illustrates the reflection for different azimuths, illustrating features of embodiments of the present invention.

After these steps, a power spectral density P(f) for an array of frequencies f was obtained. R(z) was then derived by calculating the inverse Fourier transform of P(f). The group index used in the calculation (3.75) was the average group index along the taper. It is found that a peak in the spatial response stands for the reflections from the grating coupler. The reflectance values correspond to the autocorrelation maxima and are calculated by integration over the 3 dB bandwidth around the maxima, and the results are shown in FIG. 23. It is found that the average reflections for grating couplers with a between 45° and 135° are suppressed by more than 20 dB. The optimal α is not 90°. Considering the transmission penalties, the α of the reflectionless grating couplers should be within the range between 45° and 60°.

The above example illustrates the possibilities of embodiments of the present invention for optimizing the return loss in curved grating couplers on silicon-on-insulators, more particularly a reduction of reflection by up to 30 dB as measured with optical frequency domain reflectometry is shown.

The invention claimed is:

1. A photonic integrated device, the photonic integrated device comprising:
 a waveguide embedded in a photonic substrate, the waveguide having a waveguide radiation exit surface and the waveguide being optically connected to a two dimensional grating,
 said two dimensional grating having a plurality of curved elongate scattering elements, said two dimensional grating being configured for diffracting radiation received from the waveguide toward a direction out of said photonic substrate, wherein the curved elongate scattering elements are oriented with respect to the waveguide such that, for points of the scattering elements which can be irradiated by radiations stemming from the waveguide, normal lines to at least the curved elongate scattering element closest to the waveguide radiation exit surface do not substantially intersect with said waveguide radiation exit surface of said waveguide, and wherein at least one of the plurality of elongate scattering elements forms at least a part of an ellipse having a first focus point substantially positioned on said waveguide radiation exit surface and having a major axis forming an angle different from 0° with a longitudinal axis of the waveguide,
 wherein said angle is larger than a half of the sum of a divergence angle of light emanating from said waveguide and the ratio of a maximum diameter of a waveguide end surface over a focal distance between a grating surface and the waveguide radiation exit surface.

2. The photonic integrated device according to claim 1, wherein the angle between the major axis and the longitudinal axis of the waveguide is between 10° and 170°.

3. The photonic integrated device according to claim 1, wherein the grating is an elliptical grating.

4. The photonic integrated device according to claim 1, wherein said grating is configured for diffracting radiation received from the waveguide out of the photonics integrated circuit and toward a direction forming an angle larger than 0° with a surface normal to the photonic integrated circuit.

5. The photonic integrated device according to claim 1, the photonic integrated device furthermore comprising an integrated laser optically connected to said waveguide.

6. The photonic integrated device according to claim 1, wherein said photonic substrate is a silicon-on-insulator substrate.

7. The photonic integrated device according to claim 1, wherein said plurality of elongate scattering elements comprises etched lines in a photonic substrate.

8. The photonic integrated device according to claim 1, wherein said plurality of elongate scattering elements comprises deposited material strips on top of a photonic substrate.

9. An optical system for guiding radiation, the optical system comprising a photonic integrated device according to claim 1 and an optical fiber in optical communication with the photonic integrated device in order to collect radiation directed from the waveguide by the 2D grating.

10. Use of a photonic integrated device according to claim 1 for coupling out or coupling in radiation from or to a photonic integrated device.

11. A method for coupling radiation from a waveguide embedded in a photonic integrated device out of said device, the method comprising:
 directing radiation received from said waveguide through a waveguide radiation exit surface toward a two dimensional grating,
  the two dimensional grating being configured for diffracting the radiation received from the waveguide toward a direction out of said device, and
  the two dimensional grating comprising a plurality of curved elongate scattering elements which are oriented with respect to the waveguide such that, for points of the scattering elements which can be irradiated by radiations stemming from the waveguide, normal lines to at least the curved elongate scattering element closest to the waveguide radiation exit surface do not substantially intersect with said waveguide radiation exit surface of said waveguide,
 wherein at least one of the plurality of elongate scattering elements forms at least part of an ellipse having a first focus point substantially positioned on said waveguide radiation exit surface and having a major axis forming an angle different from 0° with a longitudinal axis of the waveguide, and
 wherein said angle is larger than a half of the sum of a divergence angle of light emanating from said waveguide and the ratio of a maximum diameter of a waveguide end surface over a focal distance between a grating surface and the waveguide radiation exit surface; and
 coupling said radiation using said two dimensional grating out of said photonic integrated device.

* * * * *